US010838869B1

(12) United States Patent
Avron et al.

(10) Patent No.: US 10,838,869 B1
(45) Date of Patent: Nov. 17, 2020

(54) PREDICTIVE PREFETCH OF A MEMORY PAGE

(71) Applicant: Amazon Technologies, Inc., Seattle, WA (US)

(72) Inventors: Itai Avron, Petach Tikva (IL); Adi Habusha, Moshav Alonei Abba (IL); Maxim Tzipori, Givat-Ada (IL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/216,557

(22) Filed: Dec. 11, 2018

(51) Int. Cl.
*G06F 9/26* (2006.01)
*G06F 12/0862* (2016.01)
*G06F 12/1009* (2016.01)
*G06F 3/06* (2006.01)
*G06F 17/18* (2006.01)

(52) U.S. Cl.
CPC .......... *G06F 12/0862* (2013.01); *G06F 3/061* (2013.01); *G06F 3/0658* (2013.01); *G06F 3/0673* (2013.01); *G06F 12/1009* (2013.01); *G06F 17/18* (2013.01)

(58) Field of Classification Search
CPC ............. G06F 12/0862; G06F 12/1009; G06F 3/0658; G06F 3/0673; G06F 3/061
See application file for complete search history.

(56) References Cited

U.S. PATENT DOCUMENTS

| | | | | |
|---|---|---|---|---|
| 5,778,436 A * | 7/1998 | Kedem | ................ | G06F 12/0862 711/122 |
| 7,412,566 B2 * | 8/2008 | Lee | ..................... | G06F 12/0862 709/250 |
| 9,239,794 B1 * | 1/2016 | Merchant | ............ | G06F 12/0862 |
| 10,223,270 B1 * | 3/2019 | Audenaert | .............. | G06F 12/00 |
| 2007/0005934 A1 * | 1/2007 | Rotithor | .............. | G06F 12/0862 711/213 |
| 2007/0067382 A1 * | 3/2007 | Sun | ...................... | G06F 12/0862 709/203 |
| 2014/0149679 A1 * | 5/2014 | Rowlands | ........... | G06F 12/0862 711/137 |
| 2014/0181415 A1 * | 6/2014 | Loh | ..................... | G06F 12/0862 711/137 |
| 2016/0321183 A1 * | 11/2016 | Govindan | ........... | G06F 12/0862 |
| 2017/0031824 A1 * | 2/2017 | Choi | .................. | G06F 12/0862 |
| 2017/0161194 A1 * | 6/2017 | Loh | ..................... | G06F 12/1063 |
| 2017/0162179 A1 * | 6/2017 | Bogusz | .................. | G09G 5/395 |
| 2017/0344483 A1 * | 11/2017 | Shwartsman | ....... | G06F 12/0862 |
| 2018/0089085 A1 * | 3/2018 | Kothinti Naresh | ......................... | G06F 12/0862 |
| 2018/0150125 A1 * | 5/2018 | HomChaudhuri | ..... | G06N 20/00 |

(Continued)

*Primary Examiner* — Jing-Yih Shyu
(74) *Attorney, Agent, or Firm* — Klarquist Sparkman, LLP

(57) ABSTRACT

In a memory controller, a prefetch indication can be sent to memory to prepare the memory for a potential future read or write. Statistics can be used to select when such a prefetch should occur. The prefetch can occur without any read or write command being commenced. As a result, the memory controller predicts when to perform the prefetch. Some examples of when a prefetch can be sent include when there are other requests for the same memory page, or how often the page is requested. The page can remain open to prevent it from closing until the relevant read or write arrives. In the case that a read or write does not occur after a predetermined period of time, then a precharge can be performed to release the memory page.

18 Claims, 6 Drawing Sheets

(56) References Cited

U.S. PATENT DOCUMENTS

2019/0146716 A1* 5/2019 Yang .................... G06F 3/0659
          711/154
2019/0243766 A1* 8/2019 Doerner .............. G06F 12/0862

* cited by examiner

PREDICTIVE PREFETCH OF A MEMORY PAGE

BACKGROUND

Double Data Rate (DDR) memories are popular due to their performance and density. However, to reduce the physical size of the memory, control of the memory is typically offloaded to circuits known as DDR memory controllers. These controller circuits can be located in different places, such as integrated into a processor or a stand-alone Application Specific Integrated Circuit (ASIC) positioned between the processor and the memory.

The memory can include multiple memory pages that can be moved into a memory buffer on the memory chip under the control of the DDR controller. In general, an activate command opens a page (row) of memory so as to copy the memory page to an active memory buffer. A pre-charge command closes the memory page. Due to the large number of memory reads in a typical system, even small increases in speed of obtaining data from the memory can result in significant improvements in memory performance.

DETAILED DESCRIPTION

In a coherent system, a master agent passes through a point of coherency in case of a read access before going to Dynamic Random Access Memory (DRAM) so as to check if the to-be-read data is in a system level cache. In case the data is not at the cache, the read is sent to DRAM, which causes extra latency and reduced performance for cases where the data is known not to be in cache in advance. One way to solve this problem is to do a predictive read from DRAM, but such a read can be costly in terms of DRAM bandwidth. To overcome this problem, a prefetch indication can be sent to DRAM, to prepare it for a potential incoming read. This prefetch opens the relevant page in DRAM, to reduce activate latency. Statistics can be used to select when such an activate command should be sent to perform the prefetch. Some examples of when an activate command can be sent include when there are other requests for the same bank of memory, or how occupied the bank of memory is. The page can remain open to prevent it from closing until the relevant read arrives. In the case that a read or write does not occur after a predetermined period of time, then a precharge can be performed to release the memory page.

Figure 1:
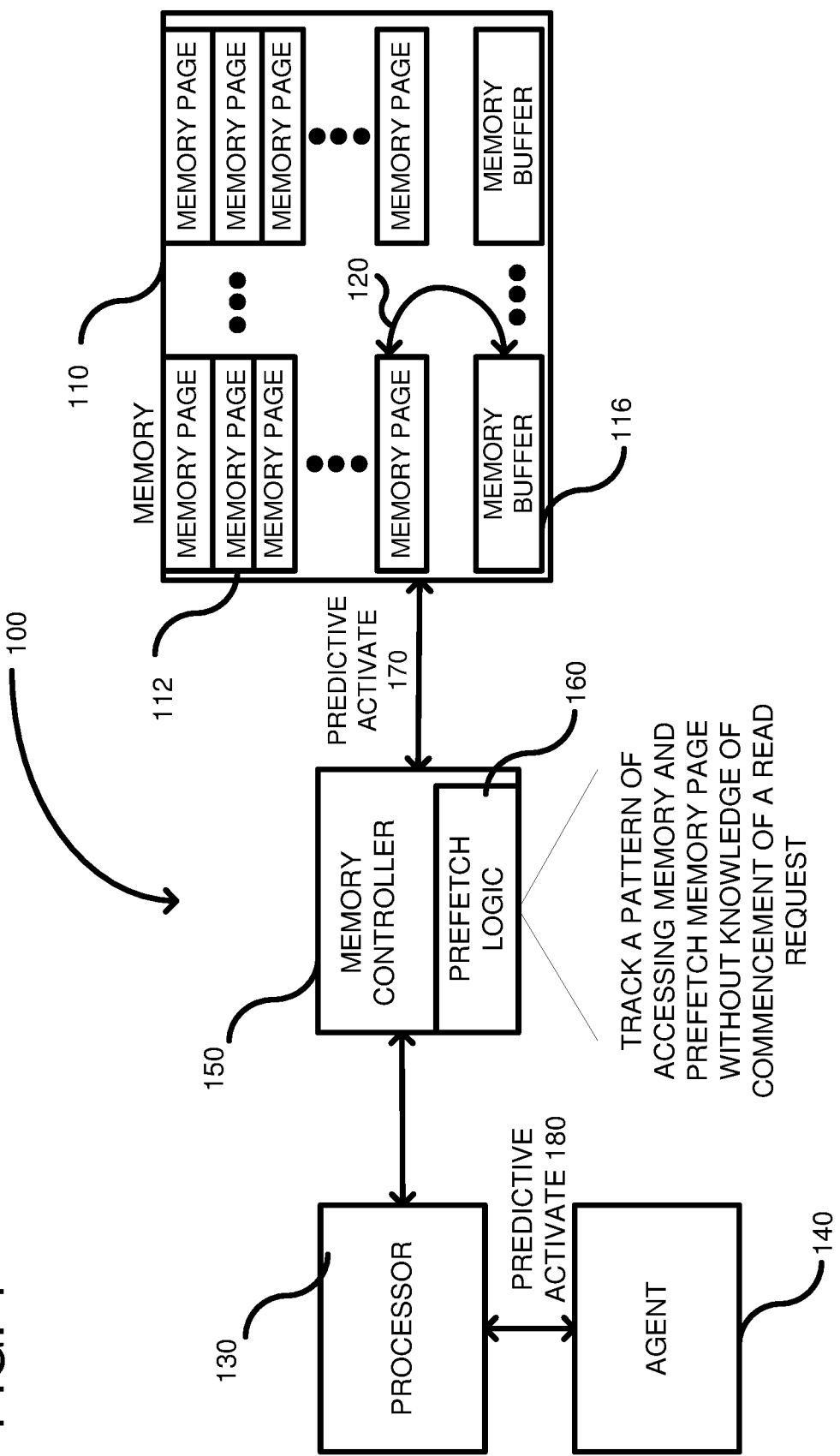
FIG. 1 is a system diagram of an example system for accessing memory including a memory controller with prefetch logic for reducing memory latency by using predictive prefetch commands.

FIG. 1 is a first embodiment of a system 100 used to perform a predictive prefetch of a memory page to reduce latency of memory reads. A memory 110 includes a memory array having a plurality of memory pages 112, wherein a memory page includes a predetermined number of bytes of memory elements (e.g., 512 KB). The memory 110 can further include a plurality of memory buffers 116. As shown at 120, one of the memory pages 112 can be moved to one of the memory buffers 116 prior to a read of the memory page. In some memories, such as DRAM, a read of a memory page is initiated through an activate command, which moves the memory page to the memory buffer in anticipation of a read command. Such a movement into the memory buffer is called a "prefetch", generally. As described herein, a prefetch relates to any memory including DRAM, SRAM, flash memory, etc., whereas an activate command can relate to DRAM more specifically. Any embodiments wherein an activate command is described can be considered to apply equally to prefetch commands and other memory types. Subsequently, when the read command is received by the memory 110, the contents of the memory buffer 116 are transferred to the requester. Such a prefetch reduces latency when the read command is issued.

Typically, the requester is a processor 130 or an agent 140 executing on the processor. In either case, memory requests are sent through a memory controller 150, which sits between the processor and the memory 110. The memory controller 150 can be a separate integrated circuit (IC) or it can be integrated into the processor 130. Example memory controllers include a double data rate (DDR) memory controller, a dual-channel memory controller, or a flash memory controller. In any case, the memory controller is a digital circuit that manages the flow of data going to and from the memory 110. The memory controller is sometimes called a memory chip controller (MCC) or a memory controller unit (MCU). In the case of DRAM, the memory controller includes logic to read and write to DRAM and to refresh DRAM.

In accordance with one embodiment, the memory controller 150 includes prefetch logic 160, which can track a pattern of accessing memory and prefetch a memory page without knowledge of commencement of a read request. Thus, autonomously, without instruction from the processor 130 and independently from a read or write request, the memory controller 150 can perform a predictive activate command 170 (in the case of DRAM, and a prefetch command more generally) to move a memory page 112 to a memory buffer 116. If the prefetch logic 160 correctly determines that the processor 130 or the agent 140 will do a future read within a predetermined period of time, then the memory page being available in the memory buffer 116 reduces the overall time to respond to a read request. As described further below, the memory controller 150 can set a timer to track an amount of time after the predictive prefetch is performed through transmission of the activate command 170. If the timer expires, the memory controller 150 can issue a precharge command (not shown) which can return the page from the memory buffer 116 to the memory page 112 and releases the memory buffer 116 for other use. In still other embodiments, the memory controller can have multiple thresholds, such as a first threshold for performing a prefetch, and a second threshold for performing a read command. Thus, for example, if the memory controller determines that a future read will occur with a high degree of probability, then the memory controller can do both the prefetch and the read of the memory page.

Figure 2:
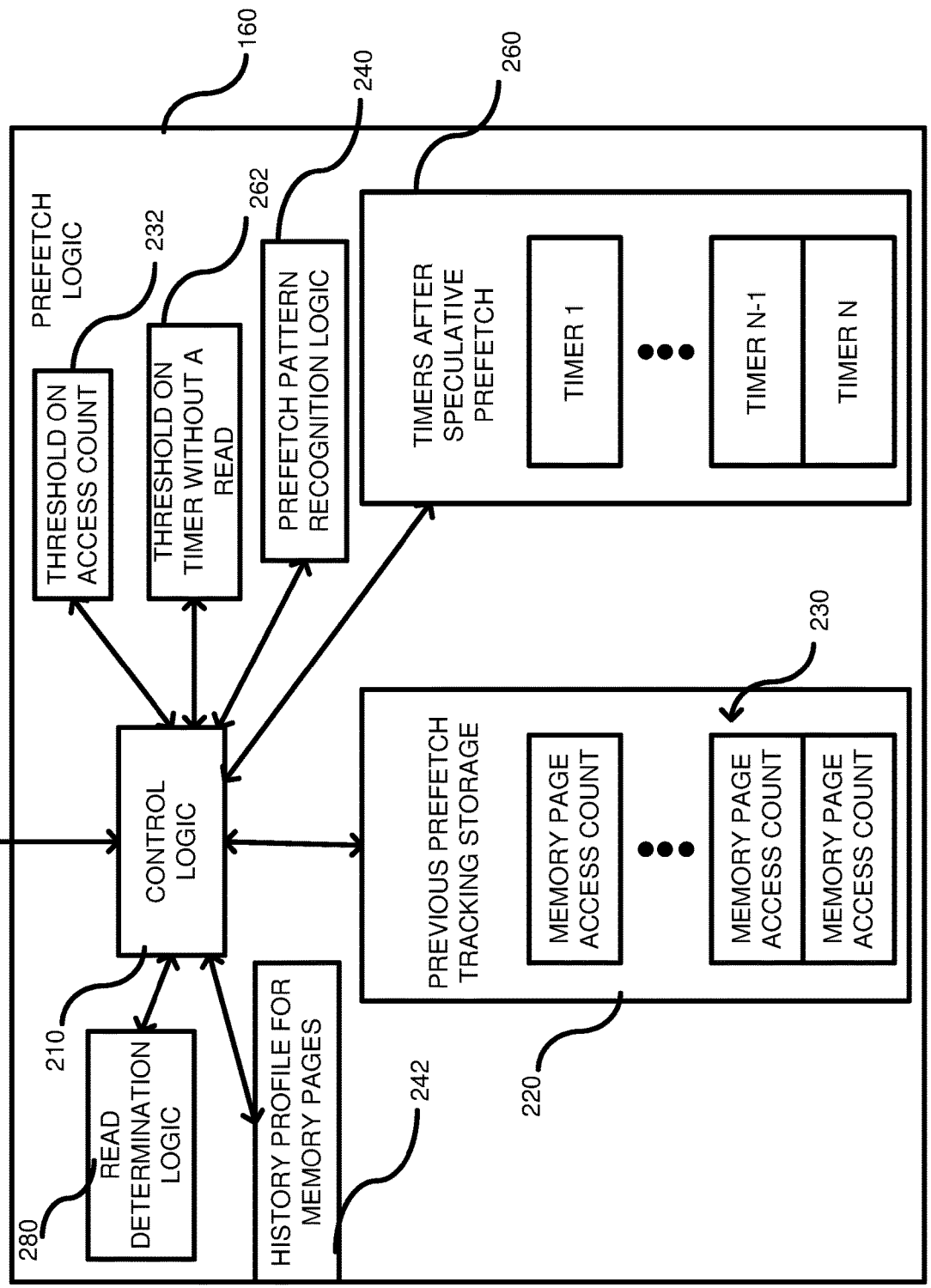
FIG. 2 shows further example details of the prefetch logic of FIG. 1.

FIG. 2 shows further details of the prefetch logic 160 according to one embodiment. The prefetch logic 160 can include control logic 210, which determines when to issue activate commands or precharge commands to the memory 110. There are numerous ways that the control logic 210 can make the determination when to issue the activate or precharge commands. For example, the prefetch logic 160 can include storage 220 that stores a page access count, shown generally at 230, for each memory page in the memory 110. Thus, each time a memory page 112 is accessed, the corresponding count 230 is incremented. In this way, the prefetch logic 160 can track each memory page access in the memory 110. The control logic 210 can perform a comparison between the counts 230 and a threshold number 232 (e.g., 10, but can be any integer value). If the memory page access count exceeds the threshold 232, then the control logic 210 can issue an activate command to the memory to prefetch the corresponding memory page without any knowledge of a corresponding read or write of memory being commenced. In this way, the memory controller autonomously performs a prefetch without knowledge of a read or write of the memory. The memory page access counts 230 is one technique for issuing an activate command. Other techniques can be used based on past history of memory page reads or writes. For example, prefetch pattern recognition logic 240 can analyze a pattern of accessing (i.e., read or write) a memory page and inform the control logic 210 to perform a prefetch based on a pattern match. In one example, a pattern can be based on a memory read occurring at predetermined intervals of time. A profile can be created for each memory page and stored in a history profile store 242 for memory pages. Other history profiles can be based on activities of the processor 130 or agent 140, such as when an application is launched, when a communication channel is activated or when writes or reads occur in relation to other events. Instead of the predictive activate command being generated by logic within the prefetch logic 160, the memory controller 150 can receive indications from either the processor 130 or the agent 140 that a predictive activate command is desired. For example, turning briefly to FIG. 1, the agent 140 is shown transmitting a predictive activate 180 to the processor hardware for transmission onto the memory controller 150, which can then, in turn, transmit the predictive activate command 170 to the memory 110. In this case, the agent has some knowledge that a read or write could occur, but is not ready to perform the read or write. In one example, the agent 140 can know that a write command is coming shortly, but the data has not yet arrived.

After an activate command is issued by the prefetch logic 160, a timer can be set using the timers 260, wherein each timer corresponds to a memory buffer. The timers 260 can have one or more timers per memory buffer to track how long a memory page has been loaded into the buffer. The timers 260 can be compared to a threshold timer value 262 (e.g., 5 seconds, but any threshold number can be used) in a round-robin fashion. If any of the timers exceed the threshold 262, then a precharge command can be issued to release the memory page from the memory buffer. More specifically, the contents of the memory buffer can be stored back into the memory page. If a read or write does occur, then the corresponding timer 260 is cleared. Additionally, if a precharge command is issued, the timer is also clear. The number of timers is shown as N, wherein N is equal to the number of memory buffers and can equal any number.

In cases wherein the prefetch logic 160 determines that a second level of threshold is reached as indicated by read determination logic 280, then a read of the memory buffer can be performed to move the memory page to the memory controller 150. The second level of threshold can be higher than the first threshold related to when to perform a prefetch command.

Figure 3:
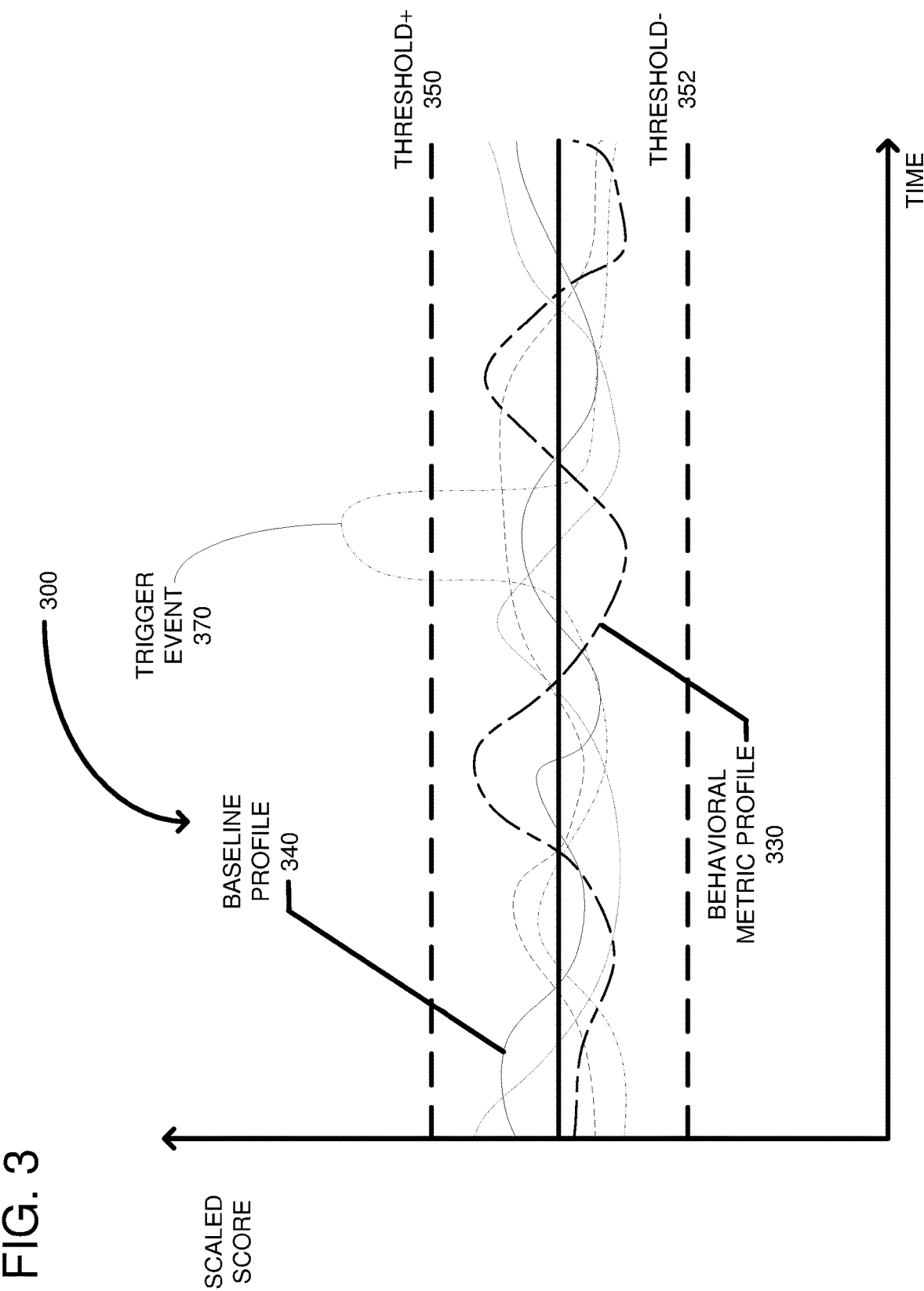
FIG. 3 shows an example graph of memory access profiling in order to determine when to do a predictive prefetch of a memory page.

FIG. 3 is an illustrative graph 300 depicting profiles derived from past memory access (read or write) metrics on a scaled Y-axis and a time-based X-axis. Each profile can relate to a memory page access. The profiles can be used to determine when a predictive prefetch should occur. The profiles can be based on a plurality of different metrics, each generating a separate profile or a combination of metrics. A behavioral metric profile 330 relates to behavior of users accessing the memory pages. For example, if users tend to access the memory pages at a predetermined time of day or a predetermined time following an event. One or more of these profiles can be combined to generate a baseline profile 340, if desired. For example, the combination can be a simple addition of profiles at the same time points. Using one or more of the profiles, thresholds 350, 352 can be generated. For example, the thresholds can be generated by taking a mean or average of a profile and then calculating a percentage deviation from the mean or average. Although only two thresholds are shown, any number of thresholds can be used, such as a different threshold for each metric.

At a certain point in time, one or more of the metrics exceeds a threshold as indicated at 370, creating a trigger event. An example trigger event can be that a memory count exceeded a predetermined threshold. For example, one of the memory page access counts 230 (FIG. 2) can exceed the threshold 232. The trigger event can result in an activate command being transmitted to the memory from the memory controller or other system fabric between the processor and the memory. The activate command can include an address associated with the memory page. The memory can respond to the activate command by copying the memory page to one of the memory buffers in anticipation of a future read, which may or may not arrive.

Figure 4:
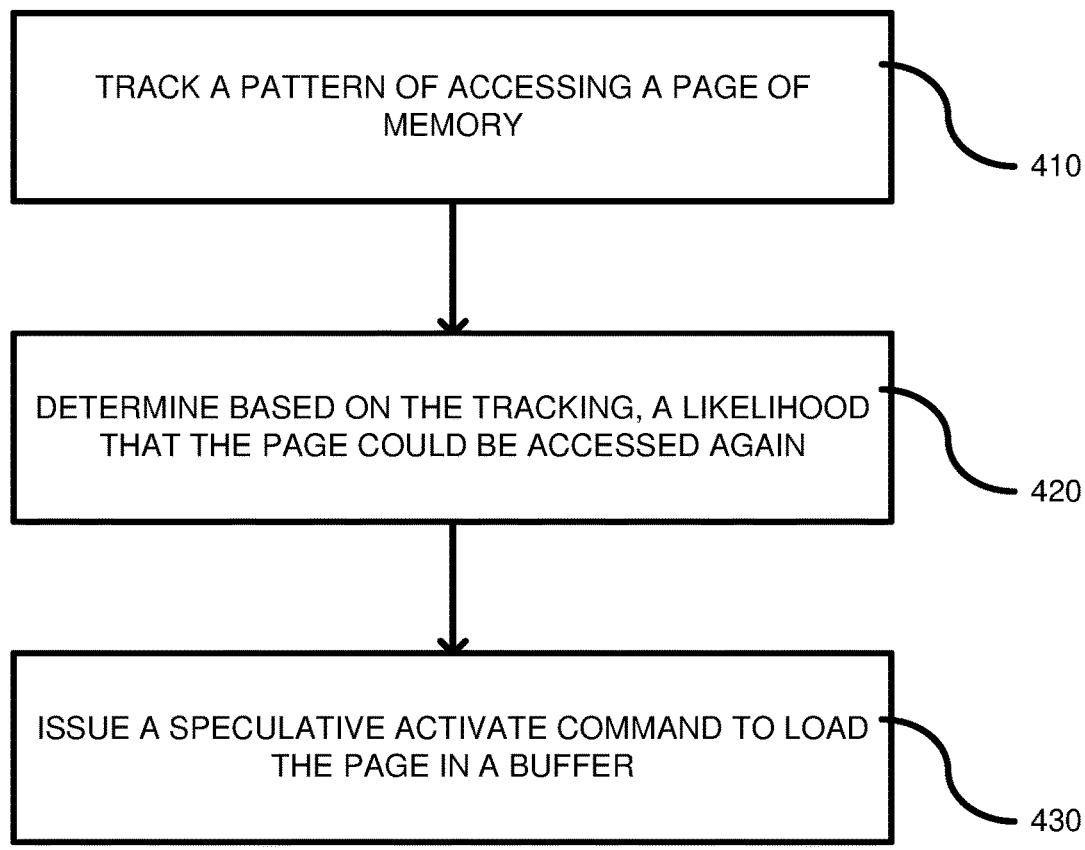
FIG. 4 shows a flowchart of an example method for accessing memory using a predictive prefetch of a memory page.

FIG. 4 is a flowchart according to one embodiment of a method for accessing a memory, such as DRAM. In process block 410, a pattern is tracked relating to accessing a page of memory. The pattern of accessing is related to past memory accesses. For example, turning to FIG. 2, the pattern of accessing can be related to how many memory page accesses occurred. The number of memory page accesses can be over a fixed time interval. For example, the memory page access counts 230 can be cleared at a predetermined frequency so as to ensure the data is not stale. Alternatively, the pattern of accessing can be associated with a pattern detected by the prefetch pattern recognition logic 240. Examples of such patterns can include memory accesses occurring at a fixed frequency (e.g., every 1 second). In process 420, a determination can be made based on the tracking that a likelihood exists that the page will be accessed again. For example, in FIG. 3, a trigger event 370 can occur that exceeds a threshold 350 indicating a statistical probability that a read can occur within a predetermined time period. Based on the determination from process block 420, in process block 430, a predictive activate command can be issued to load the page into the memory buffer in anticipation of a future read or write command. For example, the control logic 210 (FIG. 2) can transmit a predictive activate command 170 to the memory 110. In response, the memory can move the memory page 112 to the memory buffer 116. The control logic 210 can then set a corresponding timer 260 to track how long a period of time occurs before a read or write of the memory page. If the read or write occurs, the timer 260 is cleared. If a read or write does not occur, then the timer 260 reaches a threshold 262 and the control logic 210 transmits a precharge command. The timer can then be cleared.

Figure 5:
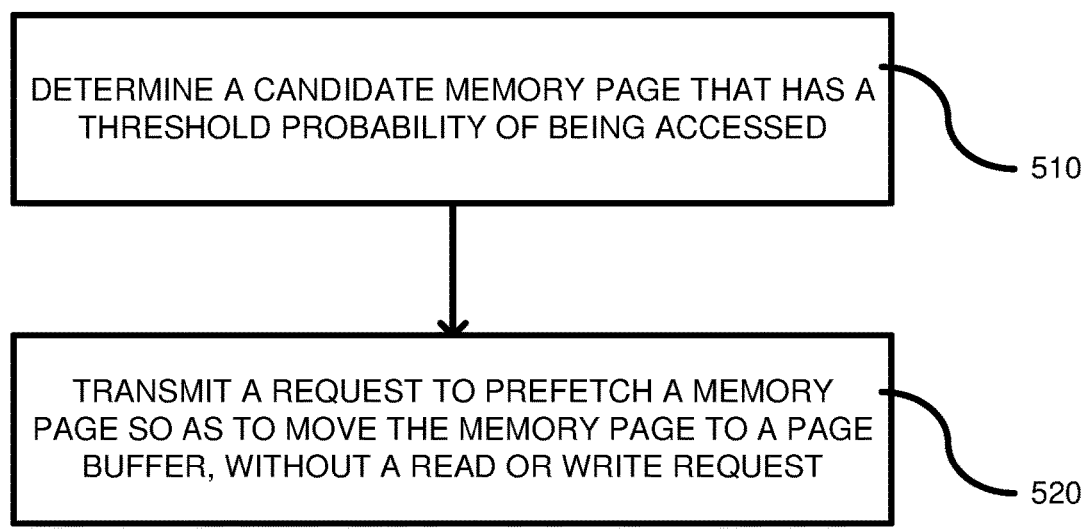
FIG. 5 is a flowchart according to another example embodiment for performing a predictive prefetch of a memory page.

FIG. 5 is a flowchart according to another embodiment of a method for accessing memory. In process block 510, a determination can be made of a candidate memory page that has a threshold probability of being accessed at a future point of time. This determination can be made by the memory controller 150 (FIG. 1) without having received a read or write request. A read or write command may not have been commenced (initiated) at this point in time. As such, the memory controller 150 autonomously determines that a read or write request is likely imminent based on statistical analysis, such as a past number of times that a read or write request has occurred for a memory page. In process block 520, a request is transmitted to prefetch a memory page so as to move the memory page to a memory buffer, without knowledge of a read or write request occurring. For example, in FIG. 1, in response to a predictive activate command 170, the memory 110 moves a memory page 112 to a memory buffer 116. The prefetch request can be generated by the memory controller 150 positioned between the processor 130 and the memory 110. More specifically, the prefetch logic 160 within the memory controller 150 can initiate the prefetch request. In some memory types, the request is an activate command. Other types of prefetch commands can be issued depending on the memory types.

In some embodiments, after the request is sent, a timer can be set and the timer can be checked periodically to determine if it exceeds a stored time 262 (a timer threshold) without a read or write request of the memory page. If so, then the timer can be reset and a precharge command can be sent to the memory to release the memory buffer and/or copy it back to the memory page. Additionally, if a read or write occurs, the timer can be reset, but without a precharge command being sent.

Figure 6:
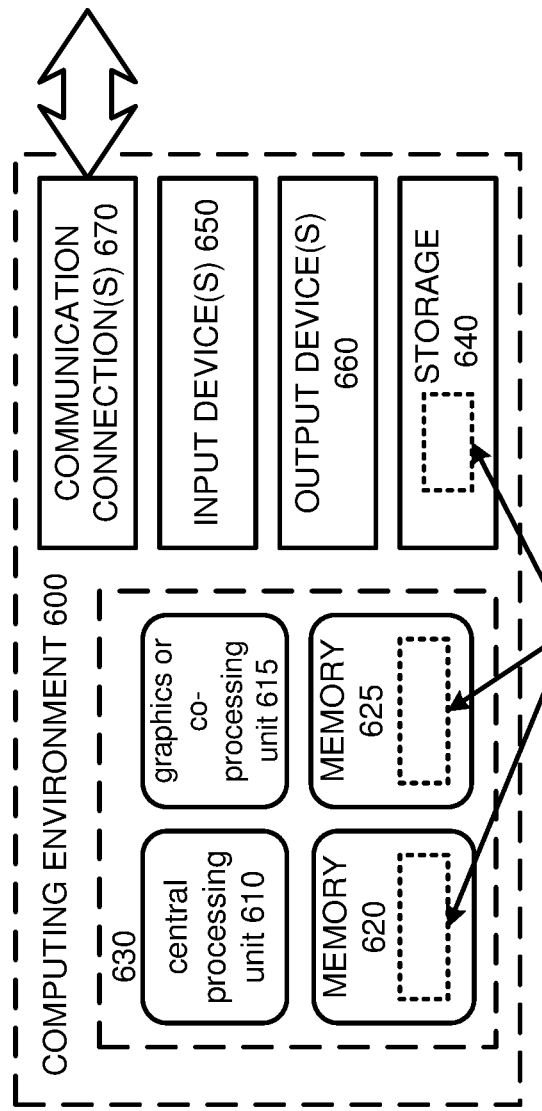
FIG. 6 depicts a generalized example of a suitable computing environment in which the described innovations may be implemented.

FIG. 6 depicts a generalized example of a suitable computing environment 600 in which the described innovations may be implemented. The computing environment 600 is not intended to suggest any limitation as to scope of use or functionality, as the innovations may be implemented in diverse general-purpose or special-purpose computing systems. For example, the computing environment 600 can be any of a variety of computing devices (e.g., desktop computer, laptop computer, server computer, tablet computer, etc.). The computing environment 600 can include the circuitry described herein, such as the components shown in FIG. 1.

With reference to FIG. 6, the computing environment 600 includes one or more processing units 610, 615 and memory 620, 625. In FIG. 6, this basic configuration 630 is included within a dashed line. The processing units 610, 615 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 6 shows a central processing unit 610 as well as a graphics processing unit or co-processing unit 615. The tangible memory 620, 625 may be volatile memory (e.g., registers, cache, RAM), non-volatile memory (e.g., ROM, EEPROM, flash memory, etc.), or some combination of the two, accessible by the processing unit(s). The memory 620, 625 stores software 680 implementing one or more innovations described herein, in the form of computer-executable instructions suitable for execution by the processing unit(s). The memory 625 can correspond to the memory 110 of FIG. 1.

A computing system may have additional features. For example, the computing environment 600 includes storage 640, one or more input devices 650, one or more output devices 660, and one or more communication connections 670. An interconnection mechanism (not shown) such as a bus, controller, or network interconnects the components of the computing environment 600. Typically, operating system software (not shown) provides an operating environment for other software executing in the computing environment 600, and coordinates activities of the components of the computing environment 600.

The tangible storage 640 may be removable or non-removable, and includes magnetic disks, magnetic tapes or cassettes, CD-ROMs, DVDs, or any other medium which can be used to store information in a non-transitory way and which can be accessed within the computing environment 600. The storage 640 stores instructions for the software 680 implementing one or more innovations described herein.

The input device(s) 650 may be a touch input device such as a keyboard, mouse, pen, or trackball, a voice input device, a scanning device, or another device that provides input to the computing environment 600. The output device(s) 660 may be a display, printer, speaker, CD-writer, or another device that provides output from the computing environment 600.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of accessing Dynamic Random Access Memory (DRAM), comprising:
    tracking a pattern of accessing a page of memory in the DRAM, wherein the tracking includes generating a baseline profile of the page based on two or more metrics of previous access to the page and calculating an average of the baseline profile;
    determining, based on the tracking, a likelihood that the page could be accessed again wherein the determining further includes comparing at least one of the two or more metrics to a threshold deviation from the baseline profile and determining that the threshold is exceeded; and
    based on the determination and prior to a read or write request being issued for a memory address within the page, issuing a predictive activate command to the DRAM to load the page into a buffer, the predictive activate command causing the DRAM to copy the page of memory and store the copy in the buffer;
    wherein the issuing of the predictive activate command includes transmitting the predictive activate command to the DRAM without a memory controller having knowledge of whether a read or write request will actually occur.

2. The method of claim 1, further including setting a timer based on the predictive activate command and waiting for the read or write request of the page of memory to occur, and if the read request does not occur, precharging the buffer to store the buffer back into the DRAM.

3. The method of claim 1, wherein the predictive activate command is issued from a memory controller positioned between a processor and the DRAM.

4. The method of claim 1, wherein the pattern of access is associated with a frequency of access occurring at fixed time intervals and a time of day that a user accesses the page.

5. The method of claim 1, further including transmitting from an agent to a memory controller a request to issue the predictive activate command.

6. A method of accessing memory, comprising:
    determining a memory page that has a threshold probability of being accessed based on past history of accessing the memory, wherein the past history includes a baseline profile that is a combination of metrics based on past access to the memory page and the threshold probability is based upon a deviation from the baseline profile; and
    transmitting a request to prefetch a memory page, when the threshold probability is exceeded, so as to move the memory page from a memory array to a page buffer within the memory, the request to prefetch the memory page being transmitted without a read or write request for the memory page being commenced;
    wherein the determining that the memory page has a threshold probability of being accessed includes tracking a frequency of access of the memory page and calculating a probability of the memory page being accessed.

7. The method of claim 6, wherein the prefetch request is generated by a memory controller positioned between a processor and the memory.

8. The method of claim 7, wherein the read or write request not being commenced includes the processor not having a current need for the memory page.

9. The method of claim 6, further including setting a timer after the prefetch request is transmitted, the timer being reset if an address within the memory page is read or written to.

10. The method of claim 9, further including precharging the memory page if the timer expires without a read or write of the memory page occurring.

11. The method of claim 6, wherein the memory includes a memory array and a plurality of page buffers for storing pages of memory associated with prefetch requests.

12. The method of claim 6, wherein the determining that the candidate memory page has the threshold probability of being accessed is made by an agent executing on a processor coupled to the memory.

13. The method of claim 6, wherein the read or write request not being commenced includes the processor that does not yet require a read or write request to be performed as part of a current task.

14. A memory controller, comprising:
    circuitry for tracking past access of a memory page, wherein the tracking includes a baseline profile, which is a combination of metrics associated with the past access;
    circuitry for transmitting a command to a memory to load the memory page into a page buffer based on the tracking, without a read or write request for the memory page being commenced; and
    a timer for counting a time between the transmission of the command and receipt of a read or write command.

15. The memory controller of claim 14, wherein the circuitry for tracking past access of a memory page includes memory registers associated with each page buffer in the memory.

16. The memory controller of claim 14, wherein the memory controller is an Integrated Circuit.

17. The memory controller of claim 14, further including circuitry for transmitting a precharge command to the memory if the timer expires, the precharge command for releasing the memory page.

18. The memory controller of claim 14, further including circuitry for determining whether only to perform the command, which is a prefetch command, or in addition, transmitting a read command for moving the page buffer to the memory controller.

* * * * *